(12) United States Patent
Justen

(10) Patent No.: US 12,086,783 B1
(45) Date of Patent: Sep. 10, 2024

(54) INTELLIGENT SHOPPING CART AND CHECKOUT SYSTEM

(71) Applicant: Anthony Justen, Tampa, FL (US)

(72) Inventor: Anthony Justen, Tampa, FL (US)

(*) Notice: Subject to any disclaimer, the term of this patent is extended or adjusted under 35 U.S.C. 154(b) by 101 days.

(21) Appl. No.: 17/400,006

(22) Filed: Aug. 11, 2021

Related U.S. Application Data

(60) Provisional application No. 63/067,395, filed on Aug. 19, 2020.

(51) Int. Cl.
  *G06Q 20/20* (2012.01)
  *G06K 7/10* (2006.01)

(52) U.S. Cl.
  CPC ....... *G06Q 20/208* (2013.01); *G06K 7/10237* (2013.01)

(58) Field of Classification Search
  CPC .......................... G06Q 20/208; G06K 7/10237
  See application file for complete search history.

(56) References Cited

U.S. PATENT DOCUMENTS

| | | | |
|---|---|---|---|
| 7,648,068 B2 | 1/2010 | Silverbrook et al. | |
| 8,269,376 B1* | 9/2012 | Elberbaum | H01H 9/167 307/115 |
| 8,448,857 B2* | 5/2013 | Davis | G06Q 30/0603 235/383 |
| 9,418,262 B1* | 8/2016 | Gentile | G06K 7/10009 |
| 10,953,906 B1* | 3/2021 | McMahon | B62B 3/1424 |
| 11,170,282 B1* | 11/2021 | Mohammad | G06F 1/1658 |
| 11,636,457 B1* | 4/2023 | De Bonet | G06Q 20/204 705/23 |
| 2009/0126139 A1* | 5/2009 | Batti | A47G 27/0243 15/216 |

(Continued)

FOREIGN PATENT DOCUMENTS

| | | |
|---|---|---|
| CN | 104340246 A | 2/2015 |
| CN | 106557791 A | 4/2017 |

(Continued)

OTHER PUBLICATIONS

Busu et al. (2011). Auto-checkout system for retail using Radio Frequency Identification (RFID) Technology. IEEE Control and System Graduate Research Colloquim.*

(Continued)

*Primary Examiner* — Peter Ludwig
(74) *Attorney, Agent, or Firm* — John Rizvi; John Rizvi, P.A—The Patent Professor®

(57) ABSTRACT

An intelligent shopping cart and checkout system is provided that can perform a fast and touchless checkout of saleable items in a store. The intelligent shopping cart and checkout system includes a readable product identifier, such as an RFID tag or a Bluetooth® or other wireless protocol enabled item identification chip having an embedded wireless communications device, for attachment to the sales items and a checkout station provided with a cooperating reader for receiving a signal emanating from the readable product identifier. A shopping cart may include a wireless communications device in wireless communication with the item identification chip and the checkout station. The item identification chip, checkout station and intelligent shopping cart are provided with status lights that turn color in response to the status or condition of the purchases.

14 Claims, 9 Drawing Sheets

(56) References Cited

U.S. PATENT DOCUMENTS

| | | | | |
|---|---|---|---|---|
| 2010/0288837 A1* | 11/2010 | Tomiyama | ......... | G06K 7/10346 235/383 |
| 2011/0208613 A1 | 8/2011 | Parham | | |
| 2011/0295704 A1* | 12/2011 | Edwards | .............. | G07G 1/0054 705/16 |
| 2013/0103519 A1 | 4/2013 | Kountotsis et al. | | |
| 2014/0027511 A1* | 1/2014 | Plocher | .................... | G06K 7/10 235/439 |
| 2014/0154492 A1* | 6/2014 | Traser | ....................... | C09J 7/26 156/60 |
| 2015/0076199 A1* | 3/2015 | Granvle | ................ | B62B 3/1464 224/411 |
| 2015/0206121 A1 | 7/2015 | Joseph et al. | | |
| 2015/0310601 A1* | 10/2015 | Rodriguez | ........... | G06Q 20/208 348/150 |
| 2017/0250808 A1* | 8/2017 | Jordahl | .................. | G06F 21/35 |
| 2018/0039841 A1* | 2/2018 | Richards | ............ | G06K 7/10722 |
| 2018/0164167 A1* | 6/2018 | Wilkinson | ................ | G01L 1/16 |
| 2018/0232796 A1* | 8/2018 | Glaser | ................ | G06Q 40/12 |
| 2018/0354540 A1* | 12/2018 | Bacallao | ............ | B62B 3/1472 |
| 2019/0213572 A1* | 7/2019 | Imamura | ............ | G06K 7/10366 |
| 2019/0236583 A1* | 8/2019 | Hagen | .................. | G06Q 20/047 |
| 2019/0266585 A1* | 8/2019 | Johnson | ............... | G06Q 20/204 |
| 2020/0019949 A1* | 1/2020 | Simmons | ............. | G06Q 10/087 |
| 2020/0108851 A1* | 4/2020 | Hagen | .................. | B62B 3/1464 |
| 2020/0151696 A1* | 5/2020 | Plocher | .................. | G07G 1/009 |
| 2021/0345794 A1* | 11/2021 | Cohn | .................... | B62B 3/1416 |
| 2023/0036947 A1* | 2/2023 | Roth | ...................... | G07G 1/009 |

FOREIGN PATENT DOCUMENTS

| | | | | |
|---|---|---|---|---|
| CN | 110706424 A | | 1/2020 | |
| EP | 1583050 A1 | | 10/2005 | |
| EP | 1693318 A1 | | 8/2006 | |
| EP | 2381409 A2 | | 10/2011 | |
| WO | WO200402132 | * | 3/2004 | ............ G09F 23/06 |
| WO | 2014002509 A1 | | 1/2014 | |
| WO | 2015051303 A1 | | 4/2015 | |

OTHER PUBLICATIONS

Shahroz et al. (Mar. 13, 2020). IOT-Based smart shopping cart using radio frequency identification.*

* cited by examiner

INTELLIGENT SHOPPING CART AND CHECKOUT SYSTEM

CROSS-REFERENCE TO RELATED APPLICATION

This application claims the benefit of U.S. Provisional Patent Application No. 63/067,395, filed on Aug. 19, 2020, which is incorporated herein by reference in its entirety.

FIELD OF THE INVENTION

The present invention relates generally to checkout systems in stores, and more particularly, to an intelligent shopping cart and checkout system for fast and touchiess checkout of saleable items in a store.

BACKGROUND OF THE INVENTION

When a customer goes to a store to purchase saleable items, the items for sale in the store are often marked with the price of the item. The marked price may be handwritten or may be printed on a tag or sticker. Other information may also be provided on the items or item labels, including expiration dates, price per weight and total price. Typically, the customer chooses items and places them in a cart or basket, which is then taken to a checkout counter and clerk. The customer removes the items from the cart or basket, and the store clerk retrieves the items, generally one by one, to add up the prices of the individual items to get a total purchase price. The customer then pays the clerk and places the items in a bag or back into a basket or cart. This common checkout process involves significant handling of the items, which is time consuming and may make the customer, and other customers waiting in line for checkout, impatient. Furthermore, this checkout process may expose both the customer and store clerk to any diseases the other may be carrying. This is especially true where the customer has a large number of items to be processed by the store clerk.

Most larger stores utilize a barcode system to encode the purchase price information on the sales items. The store clerks then either pass the barcode over a barcode scanner on a table or use a handheld scanner to scan the barcode on the individual items. This process, though not requiring the store clerk to manually tally up the total purchase price, nevertheless involves a lot of personal handling of the saleable items and takes up time since each saleable item must be individually scanned one at a time.

Some clerks have taken to using hand scanners to scan the barcodes while the items remain in the cart. However, only the items that are easily accessible may be rapidly scanned, and clerks often need to move items to scan other items that may be underneath them. And again, the items are individually and manually scanned by the store clerk, which is time-consuming and often requires a substantial amount of time if there are a significant number of purchases.

In recent years, self-checkout stations, where a customer scans their own purchases, have become prevalent. However, the items still need to be removed from the cart and placed in proximity to a scanner, all of which takes time. Additionally, and unfortunately, if the self-checkout stations are not carefully monitored, unscrupulous customers may try to only scan some less expensive items and remove more expensive items without being scanned.

Still furthermore, regardless of the method of checkout, the customer often does not know the exact total purchase price until the items have been tallied up. This can often cause confusion and even embarrassment when a customer does not have sufficient funds to purchase all the items chosen.

Finally, after the purchases have been made and the customer transports the items in their cart to their vehicle, they still need to unload the items from the cart to the vehicle. This can be problematic for the elderly and infirm, who often require store assistance to load their car. This takes valuable, and in some cases, expensive store employee time.

Accordingly, there is need for a solution to at least one of the aforementioned problems. For instance, there is an established need for an intelligent checkout system that can quickly and safely scan a large number of saleable items without removing the items from a shopping cart. There is further a need for an intelligent shopping cart system that can provide the customer with a visible list of the prices of the individual items being purchased and a running total of the total cost to avoid any unnecessary surprises and embarrassment at checkout. There is also an established need for a shopping cart that can unload its contents directly into a customer's vehicle.

SUMMARY OF THE INVENTION

The present invention is directed to an intelligent shopping cart and checkout system that can provide a fast and touchless checkout of saleable items in a store. The intelligent shopping cart and checkout system includes a wireless communication enabled item identification chip having an embedded wireless communications device for attachment to the sales items, and a checkout station provided with a cooperating wireless communications device for receiving a wireless signal emanating from the wireless communication enabled item identification chip. A shopping cart is also provided and includes a wireless communications device in wireless communication with the item identification chip and the checkout station. The item identification chip, checkout station and intelligent shopping cart are provided with status lights that turn color in response to the status or condition of the purchases. The checkout system includes a scanning cash out station and may include one or more scanning floor mats, having wireless communications devices, for communicating with the cash out station.

In an illustrative implementation of the invention, a shopping cart and checkout system for checkout of sales items in a store may include a plurality of item identification chips, each item identification chip attachable to a respective sales item for sale in the store. Each item identification chip may include a chip body and a first wireless communications device carried by the chip body. The first wireless communication device may be configured to wirelessly transmit sales item information related to the respective sales item to which said each item identification chip is to be attached. The system may further include a scanner, configured to scan each item identification chip to receive the sales item information from said each item identification chip. The system may further comprise a shopping cart, having a second wireless communications device and at least one status indicator configured to emit visible light. Additionally, the shopping cart and checkout system may include a checkout system, having a third wireless communications device and at least one status indicator configured to emit visible light. The scanner, the first wireless communications device and the second wireless communications device may be configured to communicate. The status indicators of the shopping cart and the checkout system may be configured to switch from emitting a same first color-coded light to emitting a same second color-coded light responsively to a successful scanning and reception by the scanner of the sales item information of an item identification chip of the plurality of item identification chips.

In a second aspect, the status indicators of the shopping cart and the checkout system may be configured to switch to emitting a same third color-coded light responsively to an unsuccessful scanning or reception by the scanner of the sales item information of said item identification chip of the plurality of item identification chips.

In another aspect, the shopping cart and checkout system may further include a mat. The mat may be positionable in an area configured to be in the way of the shopping cart as the shopping passes adjacent to the checkout system, such that the shopping cart must pass over the mat during a sales item checkout process. The scanner may be comprised in the mat.

In another aspect, the mat may include a fourth wireless communications device configured to communicate with the first, second and third wireless communications devices.

In another aspect, the mat may include at least one status indicator configured to emit visible light. The status indicators of the shopping cart, the checkout system and the mat may be configured to switch from emitting the same first color-coded light to emitting the same second color-coded light responsively to a successful scanning and reception by the scanner of the sales item information of said each item identification chip.

In yet another aspect, the status indicators of the shopping cart, the checkout system and the mat may be configured to switch to emitting a same third color-coded light responsively to an unsuccessful scanning or reception by the scanner of the sales item information of said item identification chip of the plurality of item identification chips.

In another aspect, each item identification chip may include at least one status indicator configured to emit visible light. The status indicator(s) of each item identification chip may be configured to switch from emitting the same first color-coded light to emitting the same second color-coded light responsively to a successful scanning and reception by the scanner of the sales item information of said each item identification chip.

In another aspect, the status indicator(s) of each item identification chip may be configured to emit the first color-coded light while said each item identification chip remains unscanned.

In another aspect, the status indicators of the shopping cart, the checkout system and said each item identification chip may be configured to switch to emitting a same third color-coded light responsively to an unsuccessful scanning or reception by the scanner of the sales item information of said each item identification chip.

In yet another aspect, the status indicator(s) of said each item identification chip may include at least one of a central light and a set of peripheral lights.

In another aspect, the shopping cart may include a basket divided into sections having different sizes.

In another aspect, the sections may include a first section, a second section and a third section, the second section being larger than the first and third sections.

In another aspect, the first section may be closer to a handle of the shopping cart, the second section may be arranged forward of the first section, and the third section may be arranged forward of the second section.

In yet another aspect, the first section may be smaller than the third section.

In another aspect, the status indicator(s) of the shopping cart may include a respective status indicator for each section of the shopping cart.

In another aspect, the status indicator(s) of the checkout system may include a respective status indicator for each section of the shopping cart.

In another aspect, the status indicator(s) of the checkout system may include a display screen. The display screen may be divided into display areas, each area corresponding to a respective section of the basket of the shopping cart.

In yet another aspect, the shopping cart may be configured to wirelessly receive the sales item information of said item identification chip of the plurality of item identification chips from said item identification chip upon a scanning of said item identification chip by the scanner, and to wirelessly transmit said sales item information to the checkout system for display of said sales item information on a display screen of the checkout system.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward an intelligent shopping cart and checkout system that can scan saleable items for purchase without having to remove the saleable items from a shopping cart of the disclosed intelligent shopping cart and checkout system.

Figure 1:
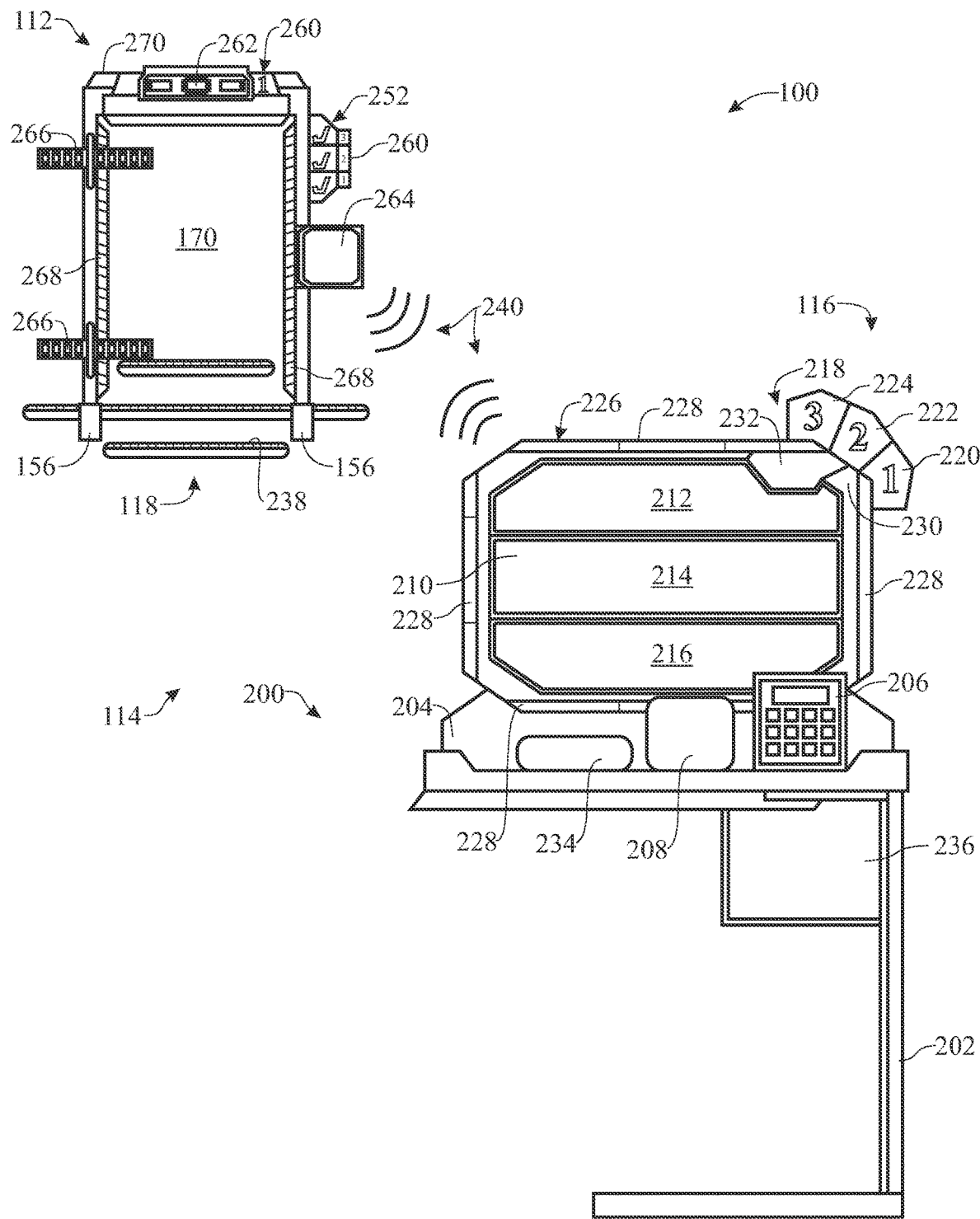
FIG. 1 presents an intelligent shopping cart and checkout system in accordance with an illustrative embodiment of the present invention, the system including a shopping cart and automated checkout station.
Figure 2:
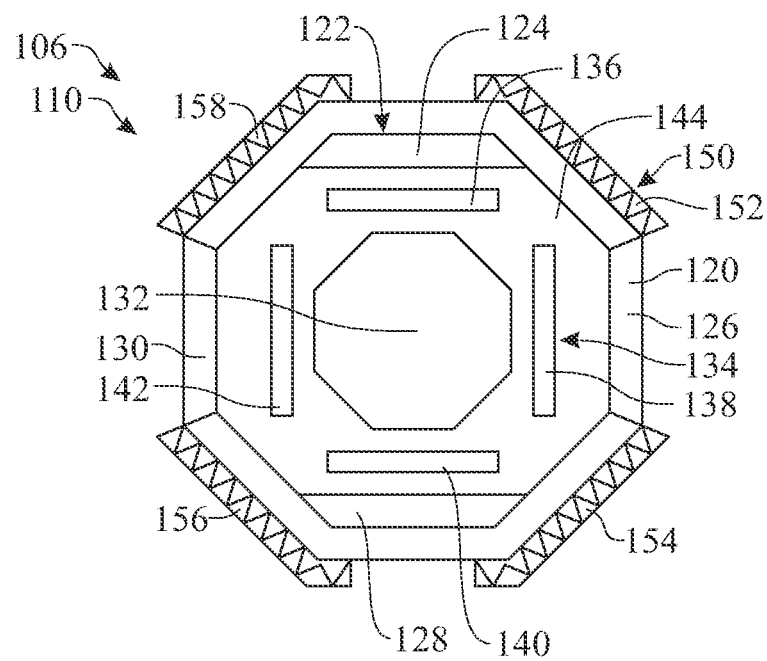
FIG. 2 presents a top plan view of a wireless communication enabled item identification chip of the intelligent shopping cart and checkout system in accordance with an illustrative embodiment of the present invention.

Referring to FIGS. 1-4, and initially with regard to FIGS. 1 and 2, an intelligent shopping cart and checkout system 100 is illustrated in accordance with an exemplary embodiment of the present invention. The intelligent shopping cart and checkout system 100 generally includes a plurality of readable product identifiers 106, shown for instance in FIG. 2, to be attached to a plurality of saleable items; the readable product identifiers 106 may include, for instance and without limitation, a Bluetooth® or other wireless communication enabled module, microchip or item identification tag, unit or chip, hereinafter referred to generically as item identification chip 110 (FIG. 2), an RFID tag, or other remotely readable or detectable component. As shown in FIG. 1, the intelligent shopping cart and checkout system 100 may further include a shopping cart 112, and a cash or checkout system 114. The checkout system 114 may include a product identifier reader having capabilities to sense or read the readable product identifiers 106; for instance and without limitation, the checkout system 114 may have Bluetooth® or other wireless capabilities to read the wireless communication enabled, item identification chip 110, or may include an RFID sensor, or other remote reader. The checkout system 114 includes a cash out station 116 and may include a floor mat scanner 118 for scanning the readable product identifiers 106 (e.g., the item identification chips 110) attached to saleable items (not shown) and contained in the intelligent shopping cart 112 in a manner described in more detail hereinbelow.

The readable product identifier 106 (containing for instance the item identification chip 110, RFID tag, etc.) eliminates the need for barcode scanners to identify the product or sales item being purchased as well as its current price. The readable product identifier 106, in conjunction with the checkout system 114, additionally enables a store to easily monitor its inventory level so as to alert store managers when sales items are getting close to needing to be replenished. More importantly, the readable product identifier 106, in conjunction with the checkout system 114, eliminates the need for either the purchaser or a checkout person to handle the item by scanning the items while they remain in the intelligent shopping cart 112. This prevents mishandling of items which could result in damage to the items as well as preventing any foreign matter or diseases in the surrounding area from being deposited on the sales items or transmitted between the customers and store clerks. Still further, the use of the disclosed intelligent shopping cart and checkout system 100 including the readable product identifiers 106, the intelligent shopping cart 112 and the checkout system 114 permits a faster and cleaner method of checking purchased items out of a store resulting in faster moving lines of customers and less time spent standing in line in close proximity to other customers.

As mentioned heretofore, in some embodiments, the readable product identifier 106 may include a wireless communication enabled item identification chip 110. With specific reference to FIG. 2, as shown, the item identification chip 110 may generally include a chip body 120 and a series of lights 122 mounted on the chip body 120. The lights 122 may include peripheral lights 124, 126, 128 and 130 as well as a central light 132. The lights 122 are preferably light emitting diode or LED type light for bright illumination and minimal power requirements. The lights 122 reflect the status of the purchase condition for easy visual evaluation by both the customer and store employees.

The intelligent shopping cart and checkout system 100 may utilize a color-coded light status identification system throughout the intelligent shopping cart and checkout system 100. The system may include a first color (e.g., blue) light status, a second color (e.g., green) light status and a third color (e.g., orange) light status to indicate to a customer and store employees both the status of items contained within the intelligent shopping cart 112 as well as the status of the checkout system 114. A first color (e.g., blue) light may indicate that the system is in a stand-by or ready mode ready to receive items to be scanned; additionally, when seen on the item identification chip 110 and intelligent shopping cart 112, the first color (e.g., blue) may indicate that items in the intelligent shopping cart 112 have not yet been scanned for purchase. A second color (e.g., green) light may indicate that the item or items have been successfully scanned and purchased, while a third color (e.g., orange) light may provide an indication that something is wrong with the purchaser, the purchase or the item itself. In this manner, both the customer and store employees can easily see the status of the sales items contained in a customer's intelligent shopping cart 112.

As noted hereinabove, in some embodiments, the item identification chip 110 may include an embedded first Bluetooth® or other wireless communications system to transmit data to the checkout system 114. The item identification chip 110 may also include an on board rechargeable power supply (not shown) for powering the wireless communications system and the lights. The item identification chip 110, in a particular embodiment, may also transmit data about the sales item it is attached to, to the intelligent shopping cart 112, so that the customer may remain aware of what is in their intelligent shopping cart 112 and have a running total of the individual and total cost of items being purchased. The chip body 120 of the item identification chip 110 is preferably formed from a variety of bio-compatible materials, such as, but not limited to, a polymer or plastic material. The wireless component or device (not shown) may be embedded within the chip body 120. The item identification chip 110 itself may have a variety of configurations such as, but not limited to, round, square, oval, multi-sided shaped and is preferably thin enough to not be obtrusive when mounted on a sale item.

While not specifically shown, the Bluetooth® or other wireless protocol component or device of the item identification chip 110 is of the type known in the industry to transmit and receive data between compatible Bluetooth® or other wireless protocol devices. In the disclosed embodiments, the transmission and reception range of the embedded wireless protocol will be substantially reduced from that of known devices to limit the transmission/reception range to less than ten feet. Preferably, the range will be limited to less than four feet to allow the cash out station 116 and/or floor mat scanner 118 to read the item identification chips 110 contained within a customer's intelligent shopping cart 112 without interference, or inclusion of items, from adjacent or nearby sales items of prior or following customers. The wireless protocol components of the item identification chips 110 can be paired or mated to the stores checkout system 114 so that other wireless devices cannot be used to avoid or override the wireless component of the disclosed item identification chips 110.

Figure 3:
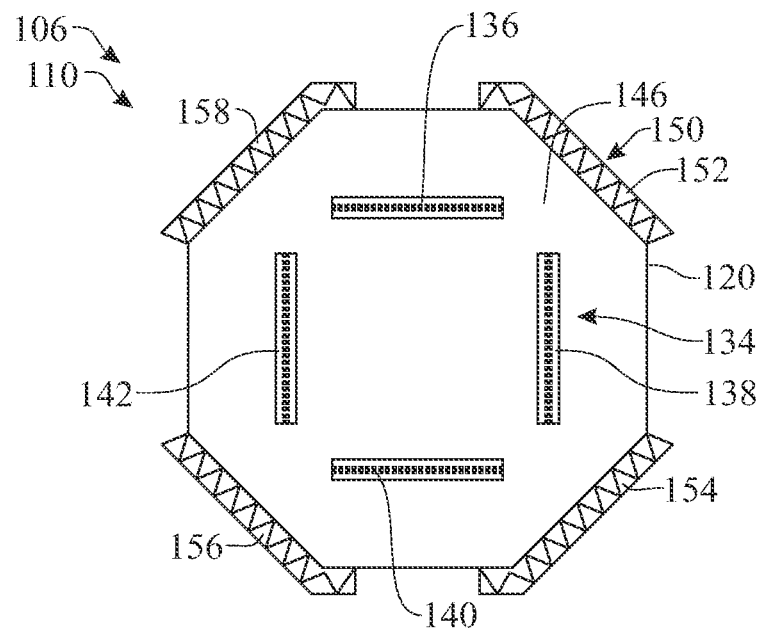
FIG. 3 presents a bottom plan view of the item identification chip of FIG. 2.
Figure 4:
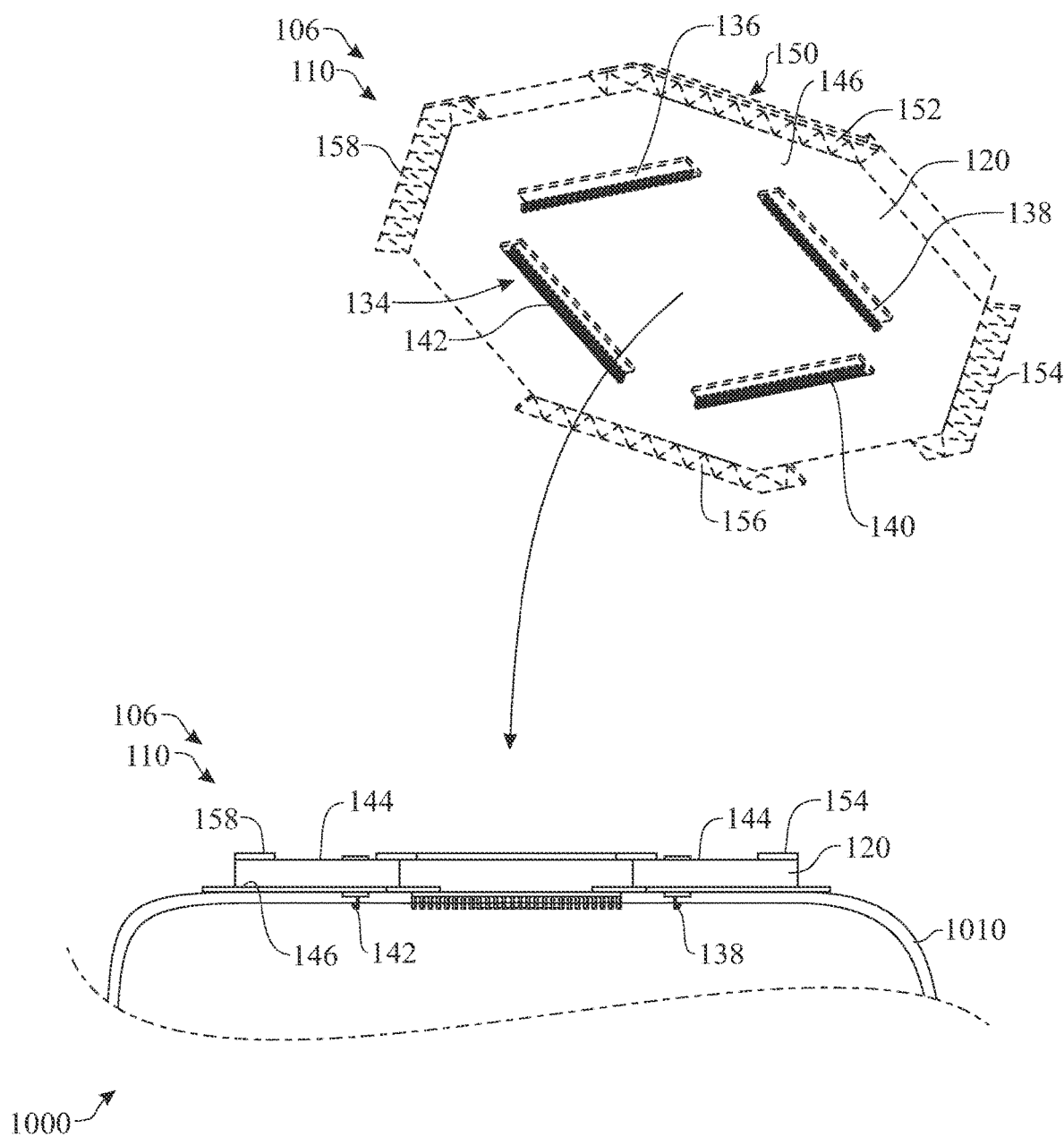
FIG. 4 presents a view of the wireless item identification chip of FIG. 2 being attached to a sales item.

Referring now to FIGS. 2-4, in order to attach the item identification chip 110 to a sales or saleable item, such as sales item 1000 shown in FIG. 4, the item identification chip 110 is provided with an attachment mechanism 134. The attachment mechanism 134 may be provided with a variety of types of fasteners to secure the item identification chip 110 to the sales item 100, such as, but not limited to, glue or adhesive strips, hook-and-loop closure fasteners, mechanical fasteners such as snap connections and the like, etc. In a preferred embodiment, the attachment mechanism 134 consists of a plurality of staple-like fasteners 136, 138, 140 and 142 which extend through the chip body 120 of the item identification chip 110 from a top surface 144 of the chip body 120 and out a bottom surface 146 of the chip body 120.

As best shown in FIG. 4, the item identification chip 110 is attached to the sales item 1000 by positioning the item identification chip 110 over the sales item 1000 and causing the fasteners 136, 138, 140 and 142 to penetrate an outer surface 1010 of the sales item 100 to firmly affix the item identification chip 110 to the sales item 110 by hooking back into the outer surface 1010 as shown. Other methods of affixing the item identification chip 110 to the outer surface 1010 of a sales item 1000 may also be used, as noted above, such as where the sales item 1000 contains perishable or liquid product to avoid spills and/or contamination of the sales item 1000.

The item identification chip 110 may also be provided with a safety feature 150 to prevent a customer from removing a sales item 1000 from the store, such as in the event that said particular sales item 1000 has caused the intelligent shopping cart and checkout system 100 to generate a third color (e.g., orange) light condition indicating something is wrong with the purchase or purchaser. To this end, the safety feature 150 may include one or more devices 152, 154, 156 and 158, located on the chip body 120 and designed to spit out or project an ink in the event that a customer tries to remove an unapproved, third color (e.g., orange) condition sales item 1000 from the store. This will be readily visible to employees who can then take action to prevent the removal. The safety feature 150 may include, for instance and without limitation, a sensor unit (e.g., geolocation module, movement sensor, proximity sensor, etc.) configured to sense that the item identification chip 110 has been removed from the store, a reservoir for containing said ink, one or more nozzles, and an injection mechanism (e.g., a pump or valve) configured to feed the ink to the nozzles responsively to the sensor unit detecting that the item identification chip 110 has been removed from the store.

Figure 5:
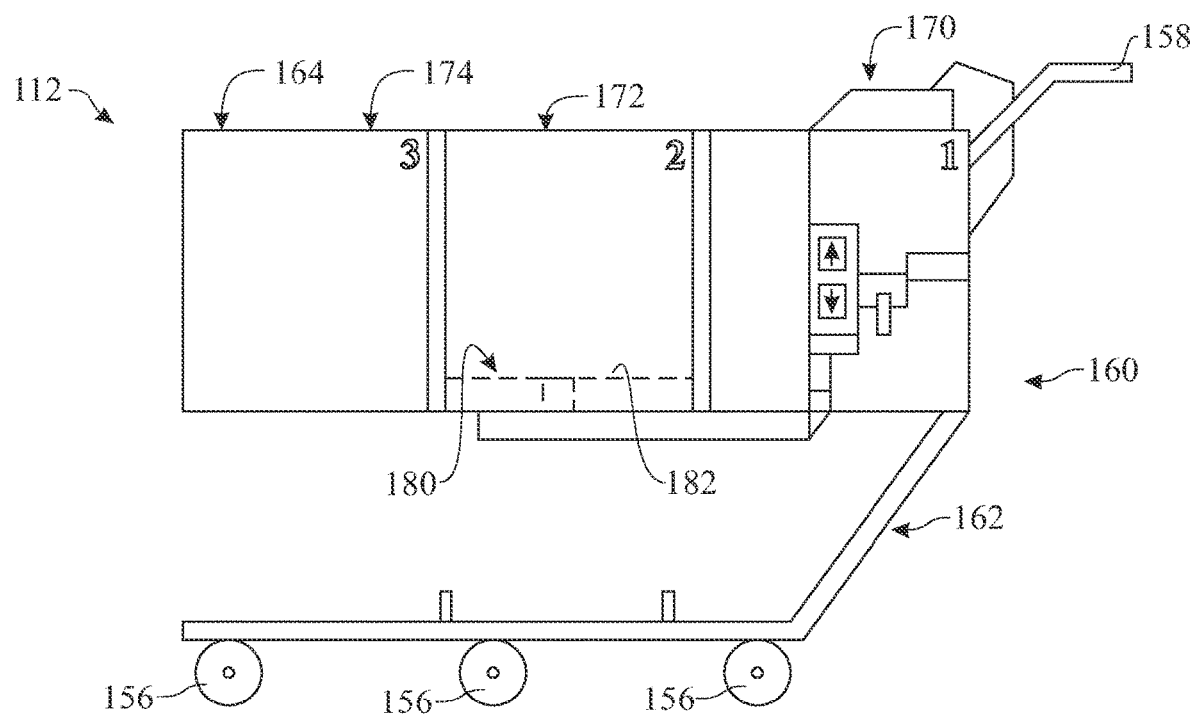
FIG. 5 presents a side elevation view of a shopping cart of the intelligent shopping cart and checkout system of the present invention in accordance with an embodiment of the present invention.
Figure 6:
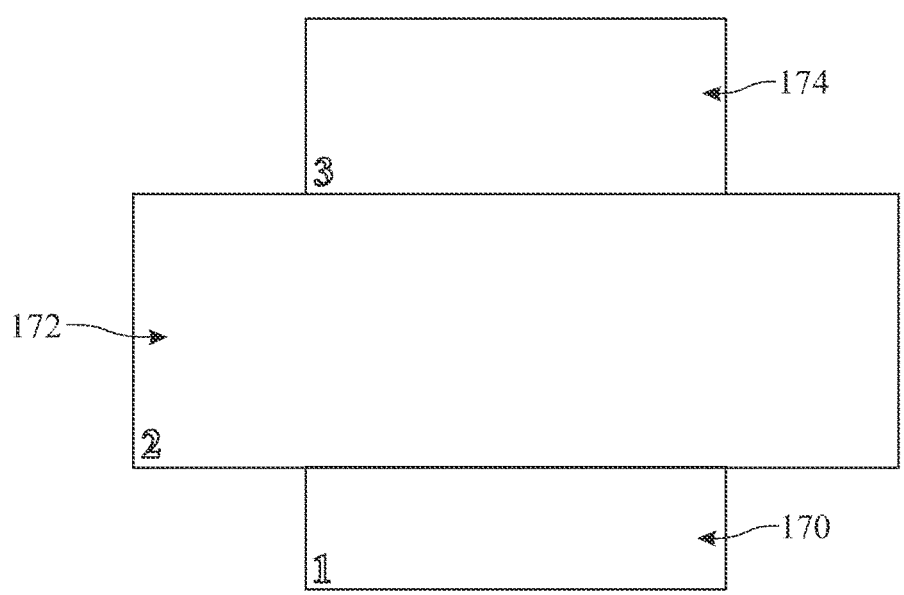
FIG. 6 presents a schematic, top view of sales item storage areas of the intelligent shopping cart of the disclosed intelligent shopping cart and checkout system of the present invention illustrating different areas of the intelligent shopping cart designed to accommodate sales items of varying sizes.

Turning now to FIGS. 5-8, and initially with regard to FIG. 5, the intelligent shopping cart 112 generally includes a cart body 160 having a frame 162 mounting a storage basket 164. Wheels 156 are mounted to the frame 162 and a push handle 158 is provided to move the intelligent shopping cart 112 around the store. With reference to FIGS. 5 and 6, in a preferred embodiment, the storage basket 164 is divided into areas of differing sized to accommodate sales items 1000 of differing sizes. For example, a rear area or basket 170, designated as area "1", may be adjacent the push handle 168 and sized relatively small to hold small sales items 1000 such as, but not limited to, tooth paste and brushes, spice jars and other small items that tend to get covered up by larger sales items 1000 like packages of paper toweling, etc. A central area or basket 172, designated as area "2", is larger to handle the biggest items like the package of paper toweling, rolls of toilet paper or boxes of diapers, and the like while a front area or basket 174, designated as area "3" can be used to hold mid-sized sales items 1000 such as, but not limited to, bottles of soda or cereal boxes, etc.

It should be noted that the sizes of the rear, central and front baskets 170, 172 and 174 can be adjusted somewhat in size. This is accomplished by providing removable and adjustable dividers (not shown). The dividers can be formed from material similar to that of the storage basket 164 such as, but not limited to, a stiff wire mesh and the like.

The intelligent shopping cart 112 also includes a second Bluetooth® or other wireless protocol communications device in Bluetooth® or other wireless protocol communication with the first wireless communications device of the item identification chip 110. The intelligent shopping cart 112 additionally includes an on board power supply which may include a battery and a solar panel.

Figure 7:
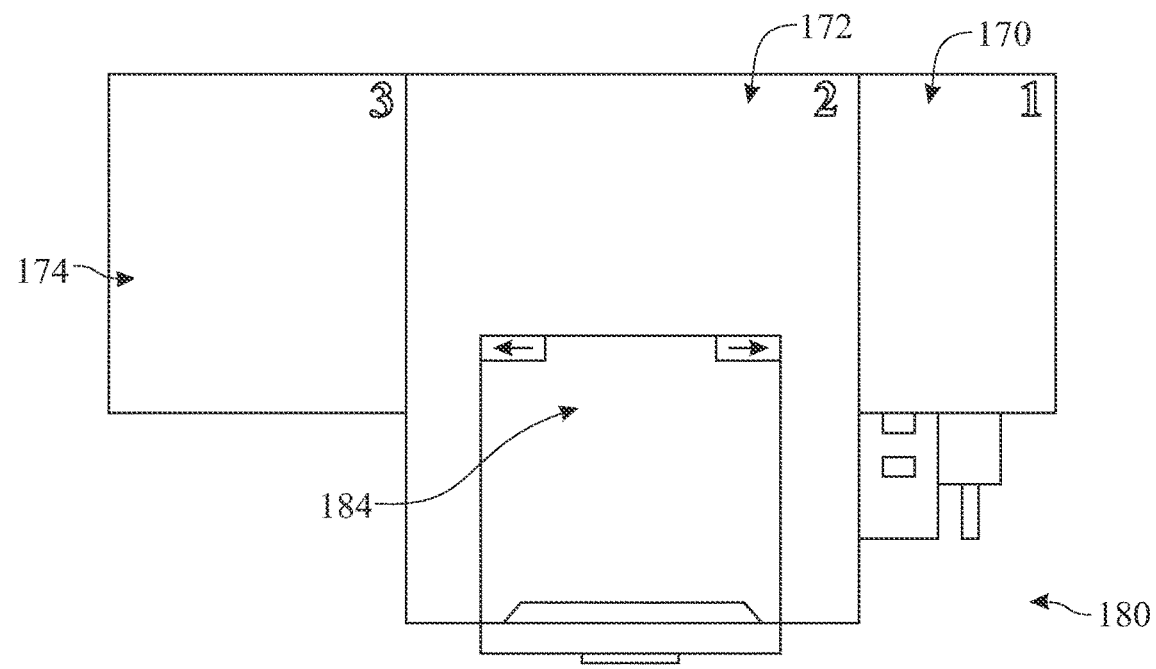
FIG. 7 presents a schematic, top view of the intelligent shopping cart of the disclosed intelligent shopping cart and checkout system illustrating an off loading system of the intelligent shopping cart and checkout system of the present invention for off loading purchases sales items into a vehicle.
Figure 8:
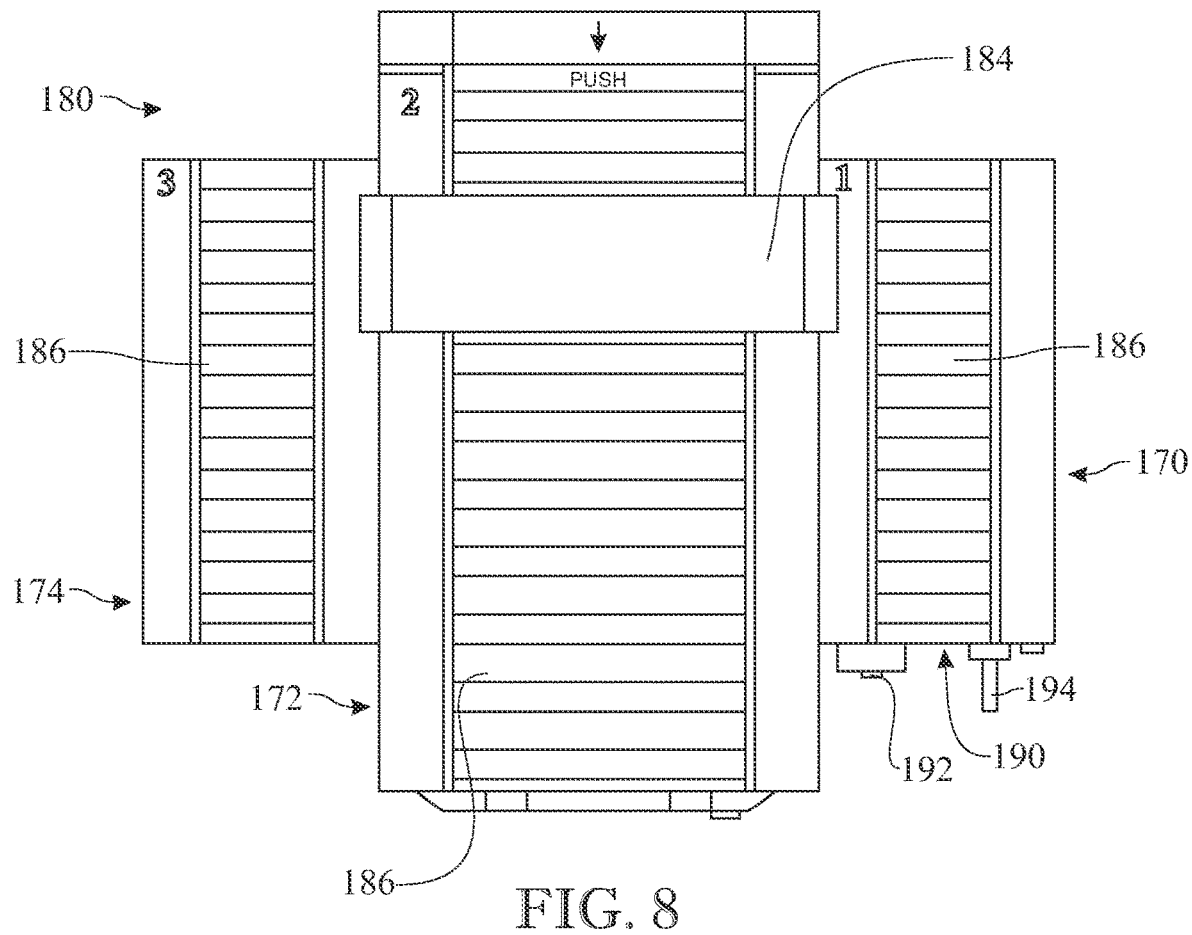
FIG. 8 presents a top view, similar to FIG. 6, of the offloading system of the intelligent shopping cart of the intelligent shopping cart and checkout system of the present invention illustrating a series of roller systems for moving purchased sales items out of the disclosed intelligent shopping cart and into a vehicle.

As best shown in FIGS. 5, 7 and 8, the disclosed intelligent shopping cart 112, in an exemplary embodiment, includes an offload mechanism 180 to facilitate moving heavier or bulkier sales items 100 out of the storage basket 164 of the intelligent shopping cart 112 and into a storage area of a customer's vehicle, such as a trunk or pickup bed. The offload mechanism 180 include a lift 182 (FIG. 5) provided in one or more of the front, central and/or rear baskets 170, 172 and 174, respectively. The lift 180 can be electric, hydraulic, pneumatic and the like similar to car jacks or lifts. A pusher 184 (FIGS. 7 and 8) is provided to move the sales item 1000 raised by the lift 182 and move the lifted sales item 1000 along a series of rollers 186 provided on the intelligent shopping cart 112. The offload mechanism 180 may also include a control center 190 having an activation button 192 to operate the lift 180 and a joystick 194 to operate and control the direction of the pusher 184. The pusher 184 may move the sales item 1000 along the rollers 186 and, for instance, onto a ramp (not shown) of the offload mechanism 180 which may be extended out to, or placed between the intelligent shopping cart 112 and, the customer's vehicle.

Figure 9:
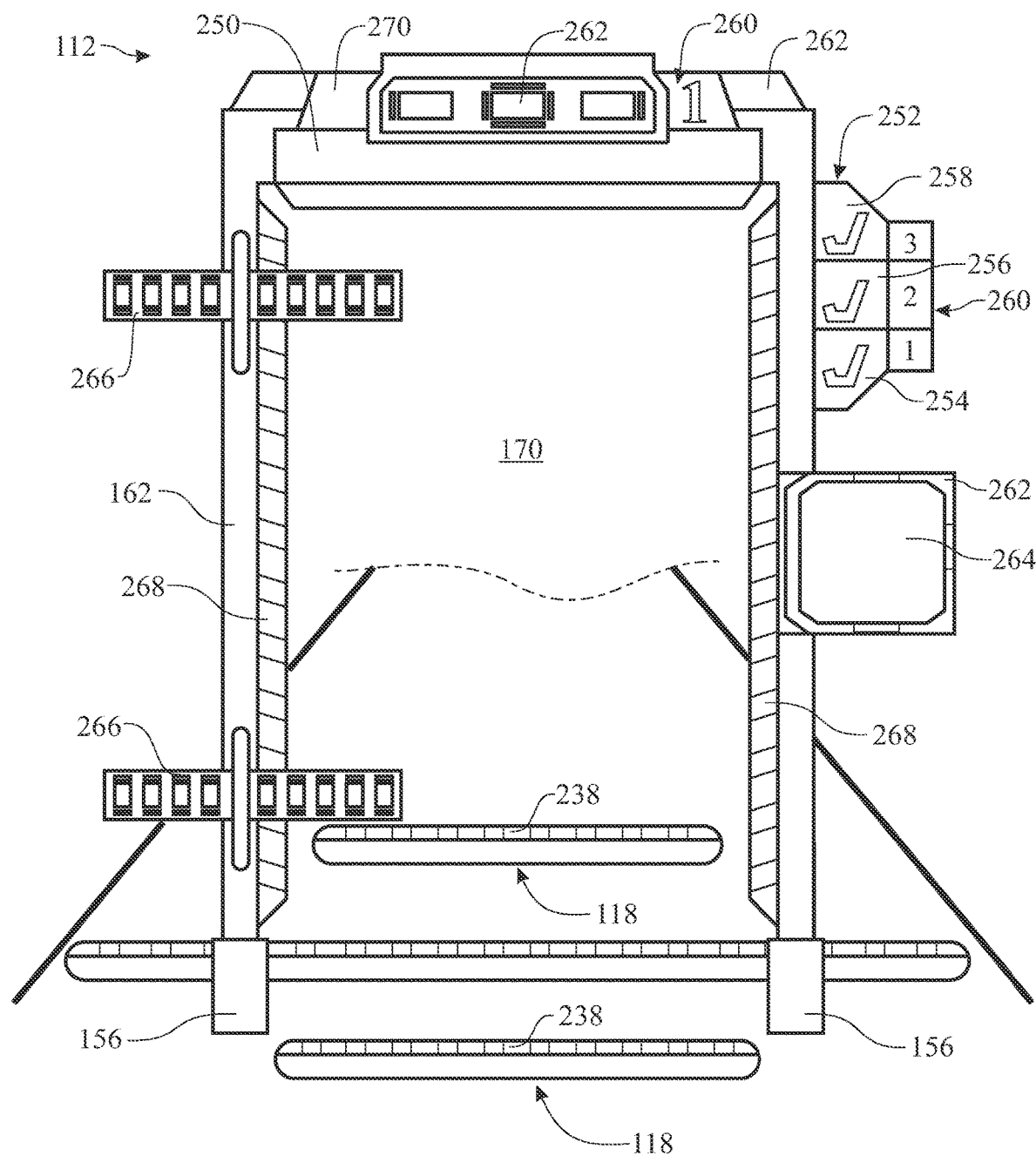
FIG. 9 presents a front view of the intelligent shopping cart of the disclosed intelligent shopping cart and checkout system of the present invention being moved over a floor mat scanner of the intelligent shopping cart and checkout system to scan sales items for purchase.
Figure 10:
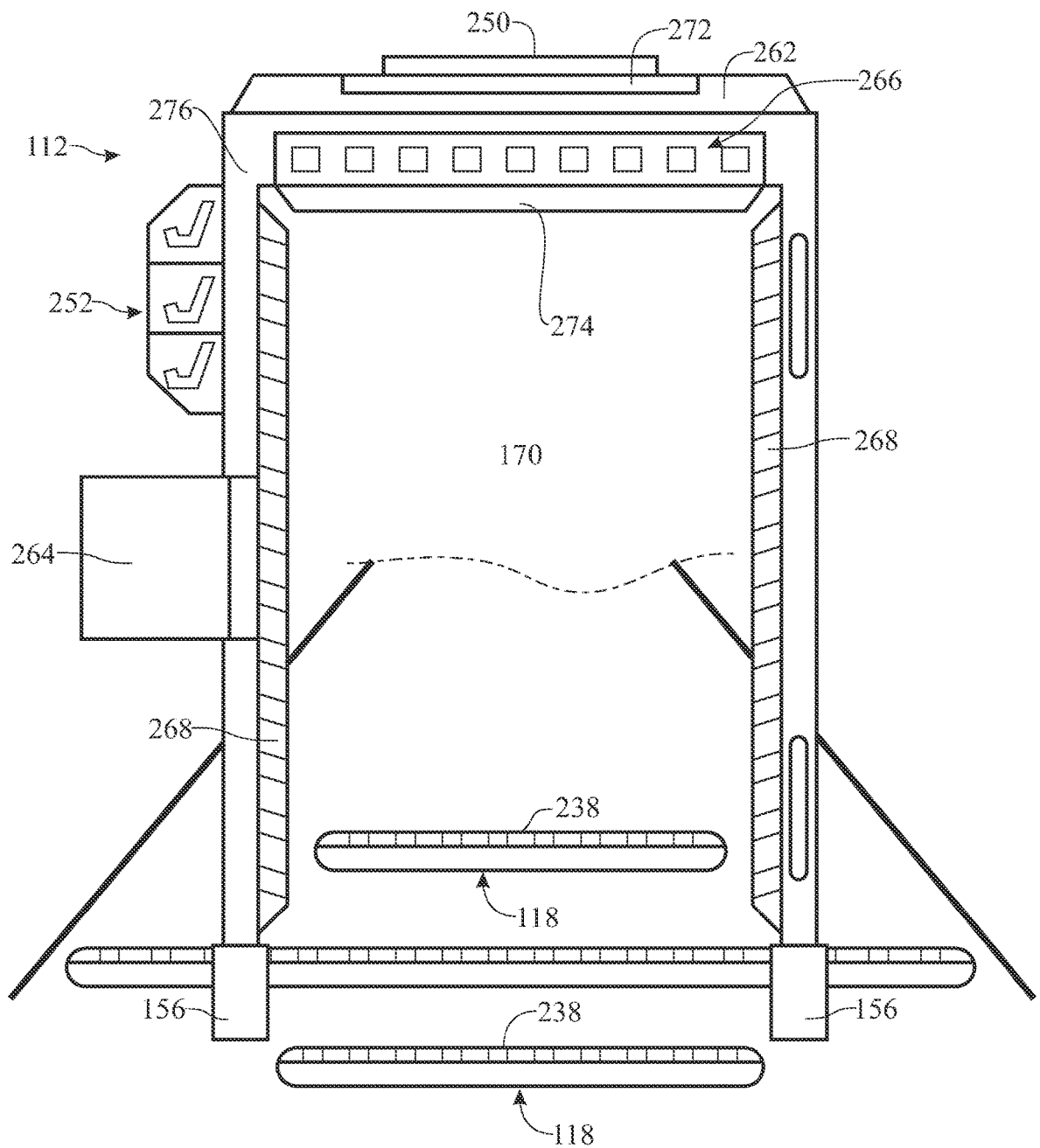
FIG. 10 presents a rear view of the intelligent shopping cart of the disclosed intelligent shopping cart and checkout system of the present invention being moved over the floor mat scanner of the intelligent shopping cart and checkout system to scan the sales items for purchase.

Turning now to FIGS. 1, 9 and 10, the checkout system 114 and its interaction with the wireless communication enabled item identification chip 110 and intelligent shopping cart 112 will now be described As noted hereinabove, the checkout system 114 includes the cash out station 116 and the floor mat scanner 118. The cash out station 116 generally includes a Bluetooth® or other wireless protocol enabled computer center 200 mounted on an elevated frame or stand 202. The computer center 200 includes a computer module 204 containing a third wireless communications system for Bluetooth® or other wireless communication with the item identification chip 110, the intelligent shopping cart 112 and the floor mat scanner 118, which is supplied with a fourth Bluetooth® or other wireless protocol communications device. The computer module 204 includes a key pad 206 for manually entering data into the computer module 204 as well as overriding status determinations as described in more detail hereinbelow. The computer module 204 additionally includes a minor display screen 208 for viewing the data entered by the key pad 206. The cash out station 116 and the scanning floor mat 118 include respective power supplies.

The cash out station 116 additionally includes a major display screen 210 which is divided into three areas or segments including a first segment 212, a second segment 214 and a third segment 216. The first segment 212 is provided to display information about the sales items 1000 contained in the first or rear basket 170 of the intelligent shopping cart 112. The displayed information may include the product name of the sales items 1000 along with how many are in that rear basket 170 of the intelligent shopping cart 112 as well as the current price for each sales item 1000, any current sales promotions and/or volume discounts, etc. Likewise, the second and third segments 214 and 216, respectively, display identical information about sales items 1000 contained in the middle and front baskets 172 and 174, respectively, of the intelligent shopping cart 112. An illuminated status indicator 218, which may be shaped like a fan in some embodiments, is mounted on the major display screen 210, such as on a top side or corner thereof, and is also divided into three status segments including a first status segment 220 corresponding to the first display segment 212, a second status segment 222 corresponding to the second display segment 214 and a third status segment 224 corresponding to the third display segment 216 of the major display screen 210. The first, second and third status segments 220, 222 and 224, respectively, are provided with internal lighting (not shown) that can turn the respective status segments to the different first, second or third color (e.g., blue, green or orange, respectively) to inform the customer and store employees of the status of the data shown on the major display screen 210. Additionally, the periphery 226 of the major display screen 210 is provided with one or more LED light strips 228 which also change color among the first, second and third color (e.g., blue, green and orange) or combinations thereof to indicate the status of the checkout system 114. As shown, the light strips 228 may be arranged at opposite left and right sides of the major display screen 210 and may be parallel to one another, and more preferably, disposed in vertical orientation.

The cash out station 116 may be provided with a security camera 230 and a self view screen 232 which may be used to video record all transactions as well as allow the customer to view what is being recorded in real time. The cash out station 116 may further be provided with a combination credit card scanner and cash/check deposit device 234 and a storage area 236 for retaining deposited cash and checks and providing a storage area for return cash change.

As noted above, the floor mat scanner 118 is an optional part of the checkout system 114 and includes a Bluetooth® or other wireless communications device (not shown) which receives a Bluetooth® or other wireless signal from the cash out station 116. The floor mat scanner 118 also includes a status light strip 238. The status light strip 238 changes color between the blue or other first color (ready), the green or other second color (good purchase) and the orange or other third color (problem) in response to a return wireless signal received from the cash out station 116. In an alternative embodiment, the floor mat scanner 118 initially reads the wireless signals coming from the item identification chips 110 on each of the sales items 1000 and communicates that data to the cash out station 116.

Turning now to FIGS. 1, 9 and 10 and initially with regard to FIGS. 1 and 9, as noted hereinabove, the intelligent shopping cart 112 is wireless communication enabled and reads the data transmitted by the individual item identification chips 110 located on the sales items 1000 and transmits that data, via a wireless signal 240 to the cash out station 116 for processing and analysis and display on the major display screen 210.

The intelligent shopping cart 112, seen in a front view in FIGS. 1 and 9, is provided with a Bluetooth® or other wireless communication enabled computer module 250 and a status indicator 252. As best shown in FIG. 9, the status indicator 252 corresponds to the status indicator 218 of the cash out station 116 and includes a first illuminated check mark segment 254 corresponding to the first status segment 220 of the status indicator 218, a second illuminated check mark segment 256 corresponding to the second status segment 222 of the status indicator 218 and a third illuminated check mark segment 258 corresponding to the third status segment 224 of the status indicator 218 of the cash out station 116. The first, second and third check mark segments 254, 256, and 258, respectively, illuminate in the first, second and third color (e.g., blue, green and orange, respectively) to indicate the status of the sales items 1000 contained in the corresponding rear basket 170, the central basket 172 and the front basket 174 of the storage basket 164 of the intelligent shopping cart 112. Station number displays are 260 are provided to display the number of the rear, central or front basket 170, 172 or 174, respectively, currently being scanned.

With continued reference to FIG. 9, the intelligent shopping cart 112 is additionally provided with one or more security cameras 262 and an on board camera display screen 264. The display screen 264 additionally provides the customer with information about the description and number of items in the intelligent shopping cart 112 and, more importantly, the individual prices of the items as well as a running total of all of the items currently in the intelligent shopping cart 112. LED light strips 266 are provided on the intelligent shopping cart 112 and illuminate in the first, second or third color (e.g., blue, green or orange, respectively) to indicate the status of the purchases. Wireless devices/detectors 268 are provided on the intelligent shopping cart 112 to detect the wireless signals. Finally, a logo pad 270 may be provided to display the store's logo.

Referring for the moment to FIG. 10, the intelligent shopping cart 112 is illustrated in a back or rear view and additionally includes a confirmation bar 272 that lights up with the color of the present status of the checkout condition. The intelligent shopping cart 112 may additionally include a message bar 274 to display a continuous series of stationary or running messages from the store, concerning topics such as, but not limited to, current sales, limited time specials, specialty offerings such as current deli sales or specials, and the like. The intelligent shopping cart may include further advertising space or an additional advertising screen 276 to display specific manufacturers logos.

Figure 11:
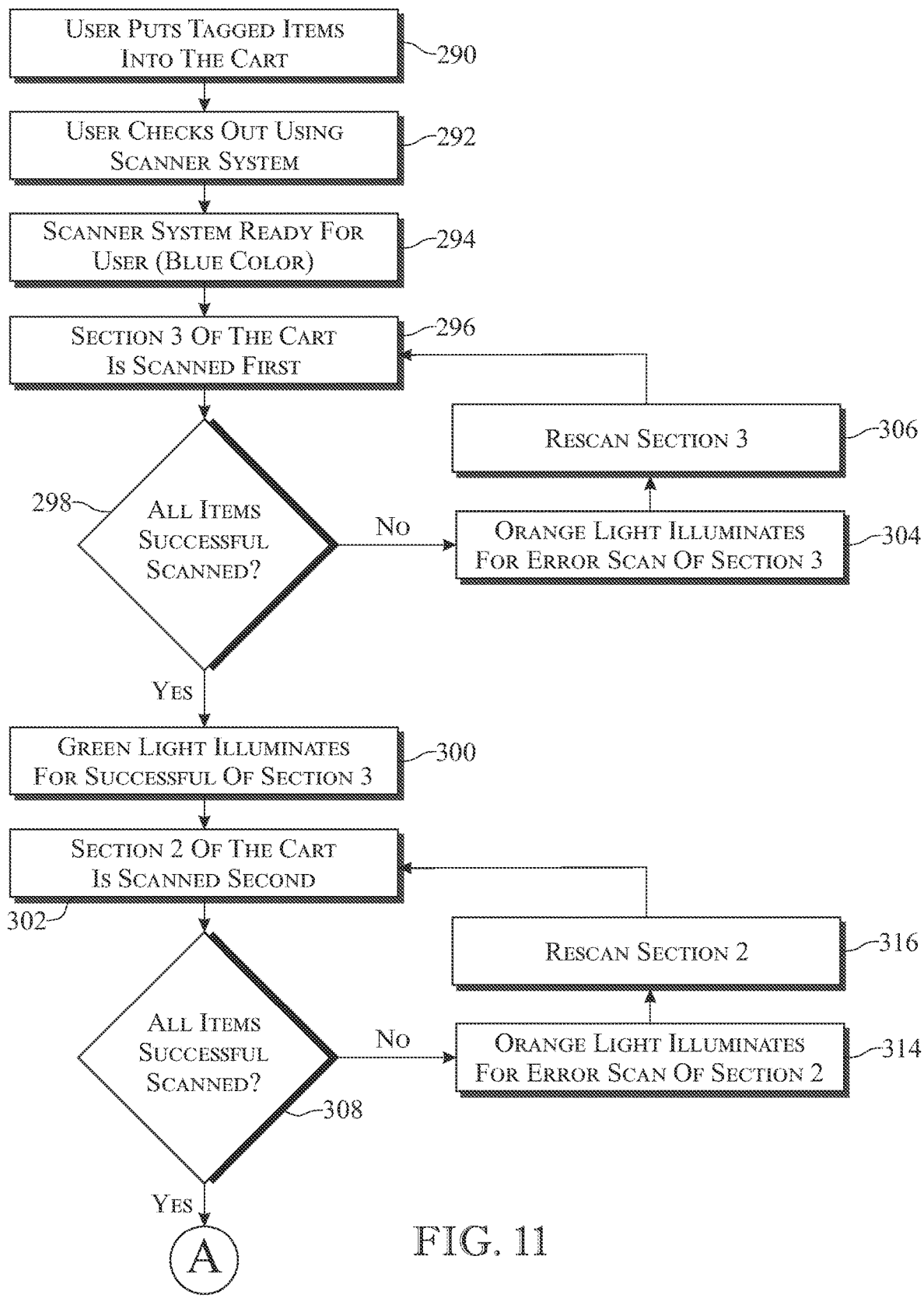
FIG. 11 presents a flowchart of a method of use of the disclosed intelligent shopping cart and checkout system, in accordance with an illustrative embodiment of the present invention.
Figure 12:
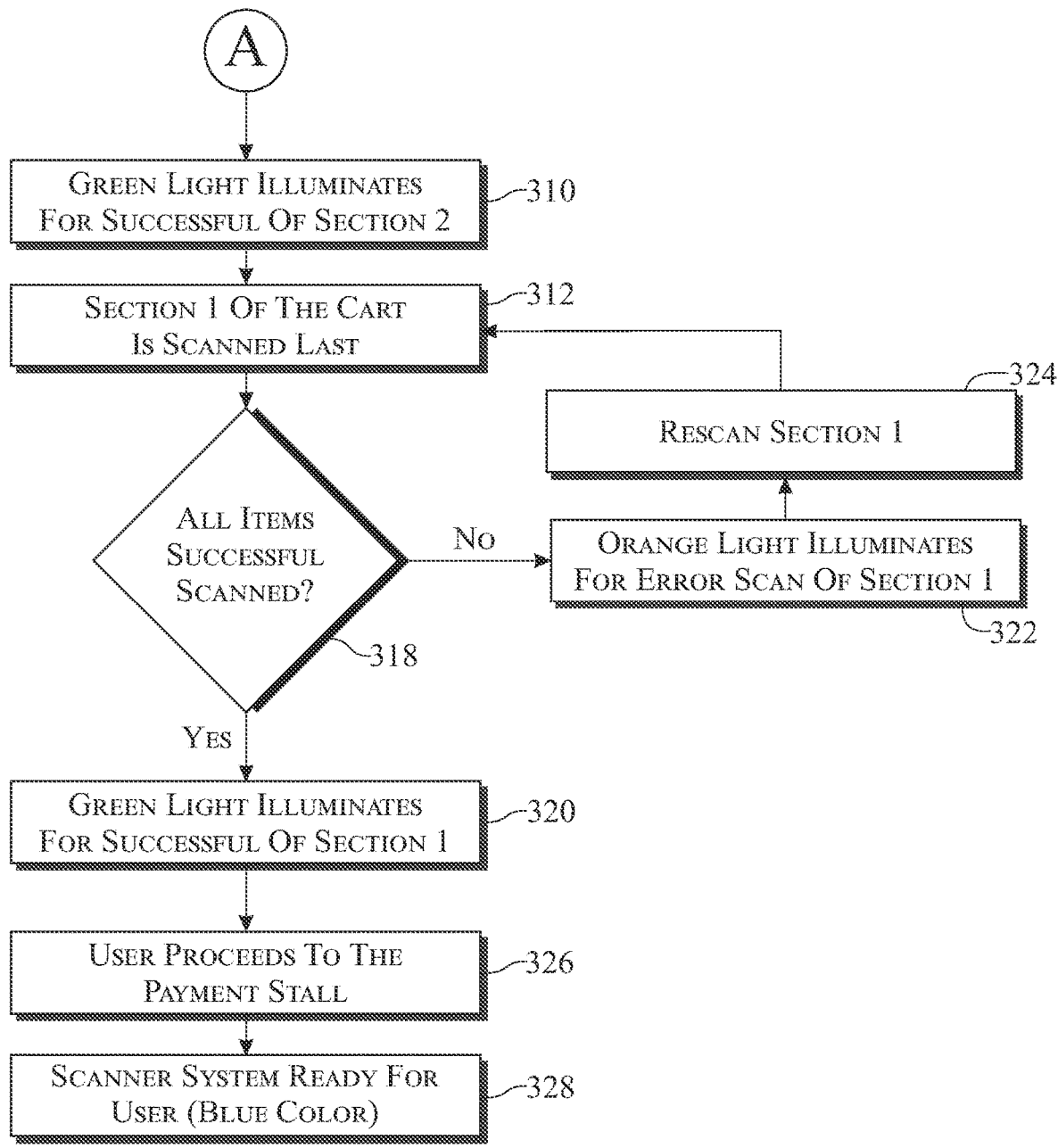
FIG. 12 presents a continuation of the flowchart of FIG. 11 depicting additional steps comprised in the method of use of the intelligent shopping cart and checkout system of the present invention.

Turning to FIGS. 11 and 12, the operation of the disclosed intelligent shopping cart and checkout system 100 will now be described. Initially, all the products or sales items 1000 in the store are tagged or affixed with the wireless communication enabled item identification chip 110. Thereafter, the users or customers obtain a shopping cart 112 and proceed to shop in the store. As the customers shop, they place the various sized sales items 1000 in the respective rear, central or front baskets 170, 172 and 174 of the shopping cart 112, respectively, depending on the size of the sales items 1000 in a first step 290. Once the customer has obtained all the sales items 1000 desired, they proceed to use the checkout system 114 in step 292. The intelligent shopping cart and checkout system 100 is in a first color (e.g., blue) light condition indicating it is ready to scan the sales items 1000 in step 294. As the intelligent shopping cart 112 approaches the checkout system 114, the wireless signal 240 emanating from the item identification chip 110 is read by the cash out station 116 and/or the floor mat scanner 118 in step 296. During this step 296, the third section or front basket 174 is scanned first as it is closest to the checkout system 114.

The checkout system 114 checks the status of the purchase of all the sale items 1000 contained in the front basket 174 in step 298 and, if successful, illuminates all the disclosed lights in the second color (e.g., green) in step 300. The checkout system 114 then proceeds to initiate scanning of the second section or central basket 172 in step 302. If, instead, as a result of step 298 the system detects that the purchase is not successful, for example a defective or expired product or a security camera has detected that an item identification chip 110 had been removed from a sales item, the disclosed lights will illuminate in the third color (e.g., orange) in step 304 and the system will rescan the item, and optionally the entire third section or front basket 174 as shown, in step 306. If the sales item 1000 passes, the lights will again turn to the second color (e.g., green) and the system proceed to scan the second section or central basket 172 in step 302. If however, the sales item 1000 does not pass, or there is another problem, the light remains in the third color (e.g., orange) state indicating to the customer and store employees that action is needed.

The process repeats itself with the second section or central basket 172 being scanned in step 302 and a determination of checkout status made in step 308. Again, if successful, the lights turn to the second color (e.g., green) in step 310 and the checkout system 114 proceeds to scan the first section or rear basket 170 in step 312. If there is an issue with the second section or central basket 172, the lights turn to the third color (e.g., orange) in step 314 and the central basket 172 is rescanned in step 316.

The checkout system 114 confirms the status of the purchases of sales items 1000 in the rear basket 170 in step 318 and, if successful, turns the lights to the second color (e.g., green) in step 320. If the scan is not successful, as above, the lights turn to the third color (e.g., orange) in step 322 and sales items 1000 are rescanned in step 324.

Once all the scans of the front, central and rear baskets 274, 272 and 270, respectively have passed and all received second color (e.g., green) lights the checkout system 114 proceeds to step 320 and the customer proceeds to pay in step 326. If the payment is accepted, the lights turn to the second color (e.g., green) and the customer may leave the store. In this manner, the disclosed intelligent shopping cart and checkout system 100 provides a safe and fast method of checking out of a store. If however, the payment has been denied due to a bad or rejected credit card, bad check scanned or insufficient cash inserted, or the like, the checkout system 114 will cause all the lights to turn to the third color (e.g., orange) to indicate to the customer and store employees that attention is needed. Once all issues have been resolved, all the lights in the intelligent checkout system 114 turn back to the first color (e.g., blue) indicating that the checkout system 114 is ready to receive the next customer with a shopping cart 112 containing sales items 1000 having the attached item identification chips 110.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A shopping cart and checkout system for checkout of sales items in a store, the shopping cart and checkout system comprising:

a plurality of item identification chips, each item identification chip attachable to a respective sales item, each item identification chip comprising a chip body and a first wireless communications device carried by the chip body, the first wireless communications device configured to wirelessly transmit sales item information related to the respective sales item to which said each item identification chip is to be attached;

a scanner, configured to scan each item identification chip to receive the sales item information from said each item identification chip;

the shopping cart, comprising a second wireless communications device and at least one status indicator configured to emit visible light; and the checkout system, comprising a checkout station of the store comprising a third wireless communications device configured to communicate with the first wireless communications device of each item identification chip, and at least one status indicator configured to emit visible light of a particular color based on a status of the sales items contained in the shopping cart; wherein;

the checkout station of the store further comprises a card scanner, a cash/check deposit device, and a storage area for retaining deposited cash and checks, the scanner, the first wireless communications device and the second wireless communications device are configured to communicate;

the status indicators of the shopping cart and the checkout station are configured to switch from emitting a same first color-coded light to emitting a same second color-coded light responsively to reception by the scanner of the sales item information of an item identification chip of the plurality of item identification chips, the shopping cart comprises a basket divided into a plurality of sections having different sizes, the at least one status indicator of the shopping cart comprises a respective status indicator for each section of the shopping cart, the at least one status indicator of the checkout station comprises a respective status indicator for each section of the shopping cart, and the at least one status indicator of the checkout station comprises a display screen, and further wherein the display screen is divided into display areas, each area corresponding to a respective section of the basket of the shopping cart, and each display area of the display screen corresponding to the respective status indicator of the respective section.

2. The system of claim 1, wherein the status indicators of the shopping cart and the checkout station are configured to switch to emitting a same third color-coded light responsively to not receiving by the scanner of the sales item information of said item identification chip of the plurality of item identification chips.

3. The system of claim 1, further comprising a mat positionable in an area configured to be in the way of the shopping cart as the shopping cart passes adjacent to the checkout system such that the shopping cart must pass over the mat during a sales item checkout process, wherein the scanner is comprised in the mat.

4. The system of claim 3, wherein the mat comprises a fourth wireless communications device configured to communicate with the first, second and third wireless communications devices.

5. The system of claim 3, wherein the mat comprises at least one status indicator configured to emit visible light, and wherein the status indicators of the shopping cart, the checkout station and the mat are configured to switch from emitting the same first color-coded light to emitting the same second color-coded light responsively to a reception by the scanner of the sales item information of said each item identification chip.

6. The system of claim 5, wherein the status indicators of the shopping cart, the checkout station and the mat are configured to switch to emitting a same third color-coded light responsively to not receiving by the scanner of the sales item information of said item identification chip of the plurality of item identification chips.

7. The system of claim 1, wherein each item identification chip comprises at least one status indicator configured to emit visible light, and wherein said at least one status indicator of said each item identification chip is configured to switch from emitting the same first color-coded light to emitting the same second color-coded light responsively to not receiving by the scanner of the sales item information of said each item identification chip.

8. The system of claim 7, wherein said at least one status indicator of each item identification chip is configured to emit the first color-coded light while said each item identification chip remains unscanned.

9. The system of claim 7, wherein the status indicators of the shopping cart, the checkout station and said each item identification chip are configured to switch to emitting a same third color-coded light responsively to not receiving by the scanner of the sales item information of said each item identification chip.

10. The system of claim 7, wherein the at least one status indicator of said each item identification chip comprises at least one of a central light and a set of peripheral lights.

11. The system of claim 1, wherein the sections comprise a first section, a second section and a third section, the second section being larger than the first and third sections.

12. The system of claim 11, wherein the first section is closer to a handle of the shopping cart, the second section is arranged forward of the first section, and the third section is arranged forward of the second section.

13. The system of claim 12, wherein the first section is smaller than the third section.

14. The system of claim 1, wherein the shopping cart is configured to wirelessly receive the sales item information of said item identification chip of the plurality of item identification chips from said item identification chip upon scanning of said item identification chip by the scanner, and to wirelessly transmit said sales item information to the checkout station for display of said sales item information on the display screen of the checkout station.

* * * * *